Oct. 8, 1946.  L. L. WESTCAMP  2,408,963
AIRCRAFT LANDING WHEEL ROTATOR
Filed June 14, 1943   3 Sheets-Sheet 1

Inventor
Leslie L. Westcamp

By Webster & Webster
Attorneys

Oct. 8, 1946.　　　L. L. WESTCAMP　　　2,408,963
AIRCRAFT LANDING WHEEL ROTATOR
Filed June 14, 1943　　　3 Sheets-Sheet 2

Inventor
Leslie L. Westcamp

By Webster & Webster
Attorneys

Oct. 8, 1946.　　　　L. L. WESTCAMP　　　　2,408,963
AIRCRAFT LANDING WHEEL ROTATOR
Filed June 14, 1943　　　3 Sheets-Sheet 3

Inventor
Leslie L. Westcamp

By
Attorneys

Patented Oct. 8, 1946

2,408,963

UNITED STATES PATENT OFFICE 2,408,963

AIRCRAFT LANDING WHEEL ROTATOR

Leslie L. Westcamp, North Sacramento, Calif.

Application June 14, 1943, Serial No. 490,711

3 Claims. (Cl. 244—103)

This invention relates in general to improvements in aircraft landing wheel structures, and in particular the invention is directed to, and has for its primary object the provision of, an aircraft landing wheel rotator arranged in unitary relation with a landing wheel and actuated by reaction with the airstream while the aircraft is in flight prior to landing.

The principal advantage of my aircraft landing wheel rotator is that it places the landing wheels in rotation prior to landing, whereby to reduce landing wheel tire wear, and which—when the wheels are not rotating prior to landing—is extremely rapid due to the sliding or skidding action which takes place as the wheels and tires are rapidly accelerated to their maximum rate of rotation when the tires first make contact with the landing surface.

Another advantage of the invention is to reduce the high stresses which are presently placed upon aircraft landing gear structures by non-rotating landing wheels when the latter are rapidly accelerated to their maximum rate of rotation upon first contact with the landing surface.

A further object of the invention is to provide an aircraft landing wheel rotator of unique design, such rotator being adapted in one embodiment for use with retractible landing gear structures, while adapted in another embodiment for use with non-retractible landing gear structures: the rotator, in the latter embodiment, normally being retained within a recess or well in one side of the wheel to reduce air drag, and power actuated for shifting movement from said well into the airstream for use.

Another advantage of the invention is the reduction of the tendency of present aircraft to nose over when the landing wheels first contact the landing surface in landing, thereby greatly increasing the safety of operation.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
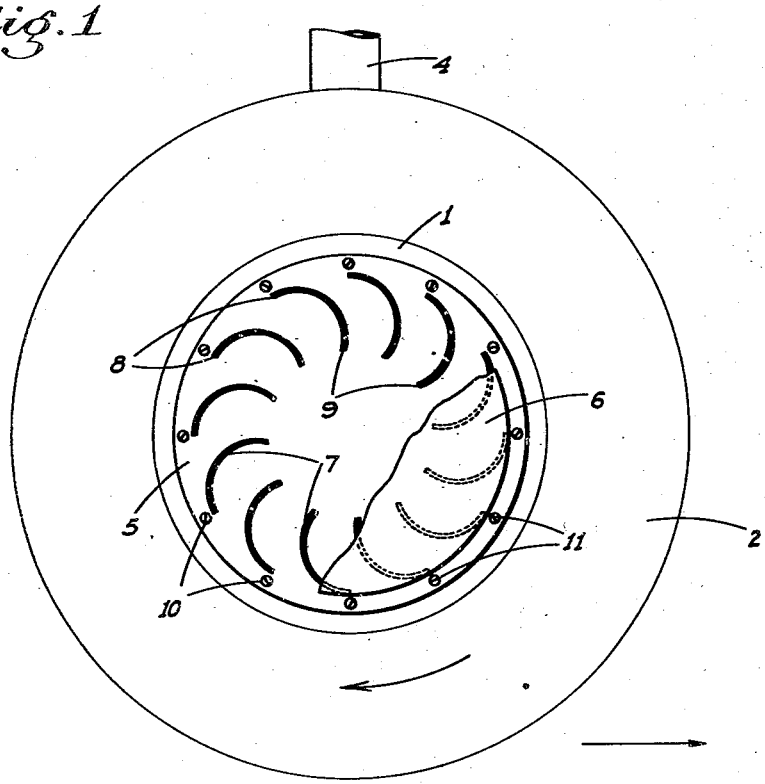
Figure 1 is a side elevation of the rotator mounted in place on the outside of a single strut-supported type retractible landing wheel; the outer disc of the rotator being partly broken away to reveal the internal construction.
Figure 2:
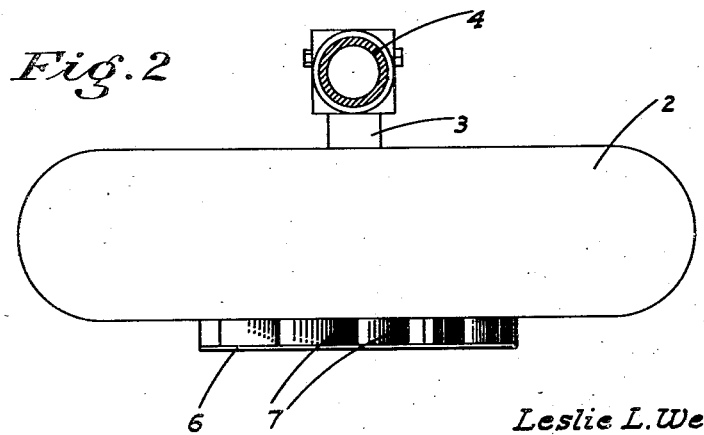
Figure 2 is a plan view of the rotator mounted as shown in Fig. 1.

Referring now more particularly to the characters of reference on the drawings, and at present to the embodiment of Figs. 1 and 2, the numeral 1 indicates a conventional aircraft landing wheel 1 fitted with a pneumatic tire 2, and which wheel is incorporated in a landing gear structure including a horizontal inwardly projecting wheel spindle 3 carried on the lower end of a vertical tubular strut 4; such landing gear structure being of a conventional retractible type.

The landing wheel rotator, which comprises the present invention, is mounted in centered relation on the outside of wheel 1 and comprises an axially inner disc 5 and an axially outer disc 6 disposed in parallel, closely spaced concentric relation.

The discs 5 and 6 are secured together by a plurality of impeller vanes, indicated generally at 7, secured between said discs in symmetrically and circumferentially spaced relation.

The vanes 7 are arcuate in a plane radially of the rotator and are disposed with their radially outer ends 8 tangent to the periphery of the axially outer disc 6; such vanes being formed on a relatively short radius and disposed with their radially inner ends 9 in leading relation to said outer ends 8. The concave side of the vanes faces forwardly when the vanes are at the bottom of the rotator.

The inner disc 5 is dimpled, as at 10, at circumferentially spaced points adjacent its periphery and such disc is secured to the wheel 1 in concentric relation by flat-headed screws 11 which seat in the dimples 10, such screws being radially beyond the periphery of disc 6 and thus accessible.

When the aircraft is in flight with the landing wheels retracted, the airstream cannot act upon the rotators and the landing wheels remain stationary. However, when the landing wheels are extended for landing, the airstream reacts with the curved vanes 7 of the rotators, producing rotation of the latter and of the landing wheels in a direction corresponding to the direction of flight.

In applying the invention to any particular type of aircraft, the dimensions and design characteristics of the rotator should be such that when the landing wheels are extended for landing, the wheels are rotated at a rate such that the linear velocity of the tire treads is substantially the same as the landing speed of the aircraft. When this condition is satisfied, there is no sliding or skidding motion of the tires when they contact the landing surface in landing, and tire wear is reduced to a minimum.

Figure 3:
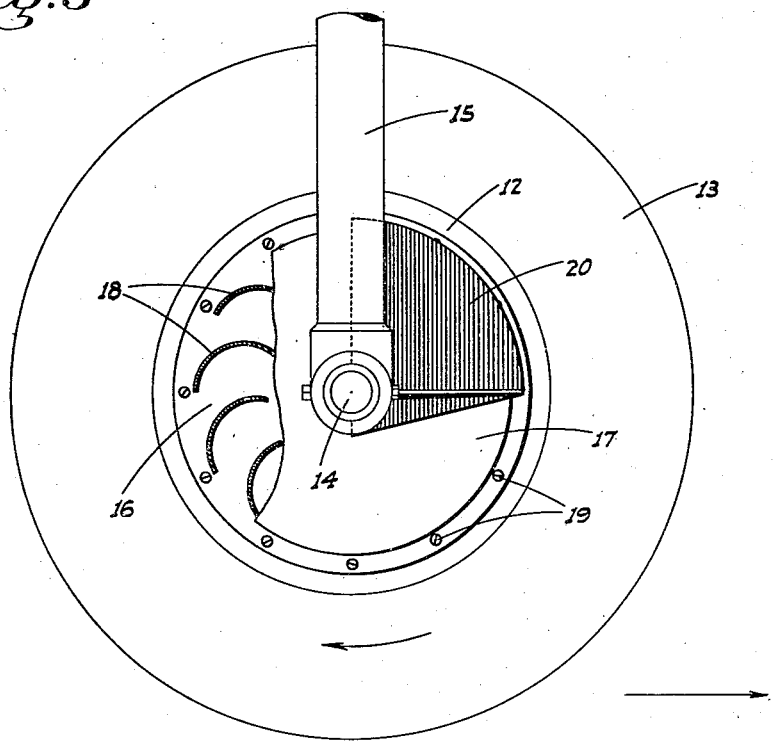
Figure 3 is a side elevation of the rotator, with the outer disc partly broken away, as mounted in place on a retractible aircraft landing wheel of the type supported by a fork-strut; the upper and forward portion of the unit being encompassed within an air stream deflector shield or hood mounted on one leg of the fork strut.
Figure 4:
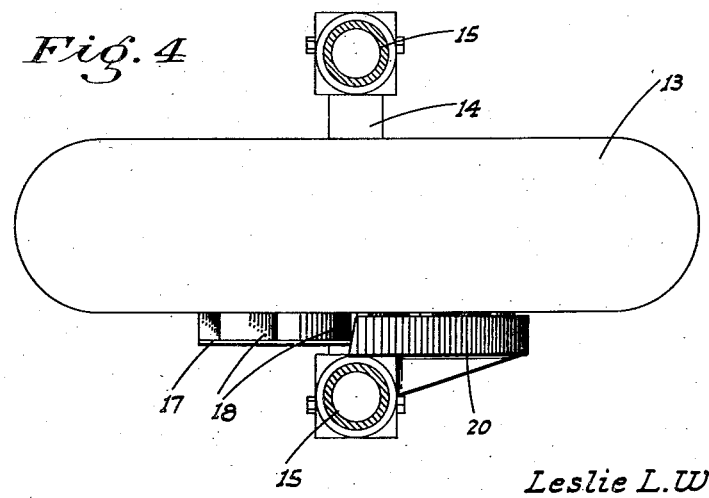
Figure 4 is a plan view of the rotator mounted as shown in Fig. 3.

Referring to the embodiment of Figs. 3 and 4, the landing gear structure is here shown as including a landing wheel 12 fitted with a pneumatic tire 13 and supported by a double-ended spindle 14 which extends through the wheel and projects axially therefrom on opposite sides; said spindle being supported at its opposite ends by a fork-type retractible landing gear strut which includes spaced legs 15.

In this embodiment the rotator is constructed in the same manner as shown in Figs. 1 and 2, except that the spindle 14 projects axially therethrough, and includes an inner disc 16, an outer disc 17, and impeller vanes 18 mounted as previously described, the inner disc 16 being secured concentrically to the wheel 12 by screws 19.

As the spindle 14 projects axially through the rotator in this embodiment, and as such spindle is of substantial diameter it tends to disrupt the air flow through the rotator and to reduce its efficiency. To compensate for this loss in efficiency I provide a shield or hood 20 of segmental construction which symmetrically encompasses the upper and forward quarter of the rotator; such hood being fixed in connection with the adjacent leg 15 of the fork-type strut and being supported in clearance relation to said rotator. As is apparent, the hood 20 prevents the air stream from striking the forward portion of the impeller above the horizontal center line thereof, which materially increases the efficiency of the device.

Figure 5:
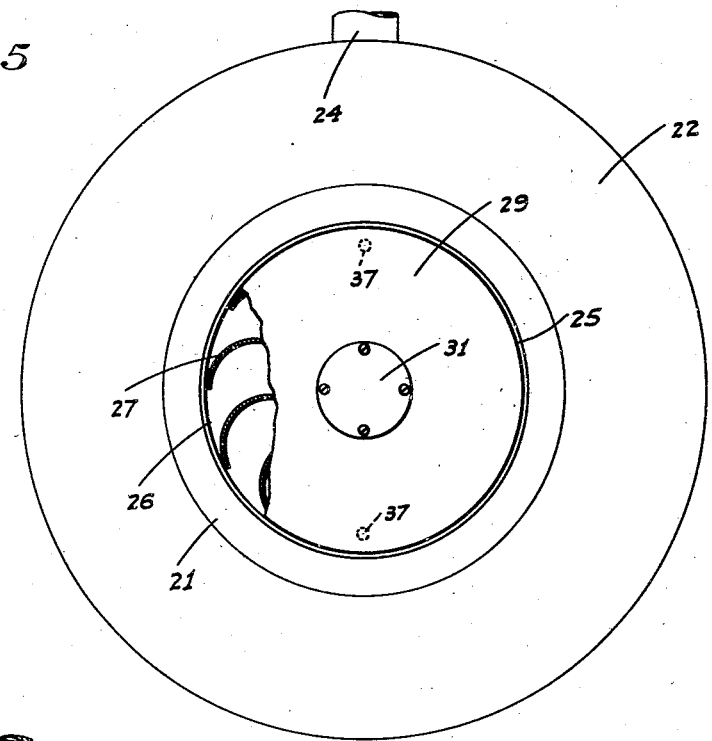
Figure 5 is a side elevation of the rotator as mounted in connection with a non-retractible landing gear structure or a rectractible landing gear structure in which the outside of the wheel, when retracted, is exposed to the airstream.
Figure 6:
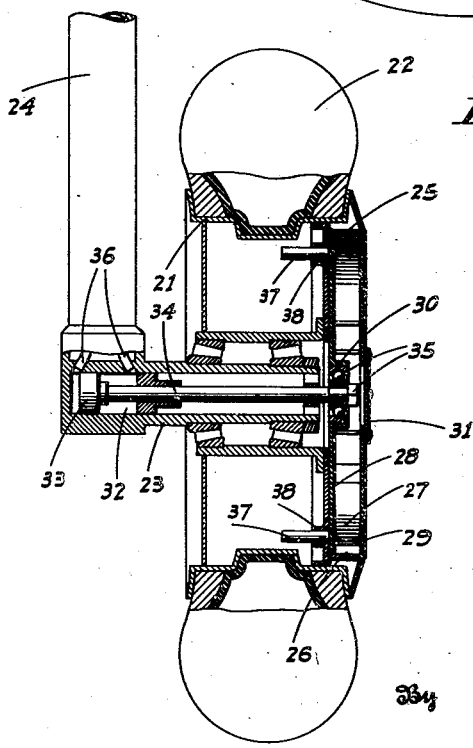
Figure 6 is a transverse section of the same.

In Figs. 5 and 6 I illustrate an embodiment of the rotor as adapted to be used in connection with a non-retractible landing gear structure, or a retractible landing gear structure in which the outside of the wheel, when retracted, is exposed to the airstream. The landing wheel 21 includes a pneumatic tire 22, the wheel being supported by a tubular spindle 23 fixed in connection with the lower end of a supporting strut 24.

The wheel 21 on the outside includes an annular flange-like portion 25 which forms a relatively shallow outwardly opening well or recess 26 which opens to the outside of the wheel. This recess is of a diameter and depth to closely receive the rotator, indicated generally at 27, and which is constructed substantially as previously described, except that here the inner and outer discs, indicated at 28 and 29 respectively, are of equal diameter, and the inner disc 28 is formed with a hub 30 to which access is had by a center plate or cap 31 on the outer disc 29.

When the aircraft is in flight the rotator 27 is disposed within the well 26, whereby to reduce air drag, but upon preparation for landing the rotator is advanced from the well into the air stream in the following manner:

The spindle 23 is hollow and formed at its inner end as a closed-end cylinder 32 in which a piston 33 is slidably disposed. A piston rod 34 extends from the piston 33 centrally through the spindle 23 to the rotator 27. The rotator is turnably but axially immovably secured on the outer end of the piston rod 34 by means of a bearing and nut assembly, indicated generally at 35. The piston 33 is double-acting in the cylinder 32 and fluid pressure is introduced into opposite ends of the cylinder 32 by means of conduits 36. Fluid pressure is selectively passed into said conduits by a valve (not shown) under the control of the pilot. Circumferentially spaced drive pins 37 are fixed on the inner disc 28 and project inwardly parallel to the spindle 23 through matching bores in sleeves 38 in the wheel 21. When the rotator 27 is advanced axially into the air stream by the fluid pressure mechanism, said rotator will be rotated by the influence of such air stream, and which rotation will be transmitted by pins 37 to the wheel 21.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with an aircraft landing gear structure which includes a spindle and a wheel journaled on said spindle, one side of the wheel being unobstructed; a circular rotator unit for the wheel, the unit being of limited axial extent and the wheel having a rotator unit receiving well therein open to said one side, the unit normally being disposed in the well, separate power actuated means operative to move said unit in and out of the well, the unit when out of the well being in the path of and rotated by the airstream, and a drive connection between the rotator unit and said wheel.

2. A structure as in claim 1 in which said drive connection comprises a plurality of pins secured on the rotator unit and projecting into the wheel, the latter having corresponding sockets in which said pins slidably engage.

3. A structure as in claim 1 in which said spindle is tubular, said power actuated means comprising a closed end cylinder formed in said spindle, a double acting piston slidable in said cylinder, means to feed fluid under pressure to either end of said cylinder, a piston rod connected with the piston and extending therefrom axially through the spindle and projecting into said well, and means turnably mounting the rotator unit on the projecting portion of said rod in axially immovable relation.

LESLIE L. WESTCAMP.